(12) United States Patent
Rooney et al.

(10) Patent No.: US 9,947,049 B2
(45) Date of Patent: Apr. 17, 2018

(54) METHODS AND APPARATUS TO CALCULATE AND PRESENT TRANSACTION ADJUSTED VALUES

(71) Applicant: TRADING TECHNOLOGIES INTERNATIONAL INC., Chicago, IL (US)

(72) Inventors: Patrick Joseph Rooney, St. Charles, IL (US); William Tigard Baker, Hoffman Estates, IL (US); Thomas Jeffrey Weiss, Skokie, IL (US); Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 318 days.

(21) Appl. No.: 14/579,883

(22) Filed: Dec. 22, 2014

(65) Prior Publication Data

US 2016/0180460 A1    Jun. 23, 2016

(51) Int. Cl.
*G06Q 40/04* (2012.01)

(52) U.S. Cl.
CPC .................. *G06Q 40/04* (2013.01)

(58) Field of Classification Search
None
See application file for complete search history.

(56) References Cited

U.S. PATENT DOCUMENTS

| | | | |
|---|---|---|---|
| 4,885,685 A | 12/1989 | Wolfberg et al. | |
| 6,317,728 B1 | 11/2001 | Kane | |
| 6,408,282 B1 | 6/2002 | Buist | |
| 6,772,132 B1 | 8/2004 | Kemp, II et al. | |
| 6,850,555 B1 | 2/2005 | Barclay | |
| 6,938,011 B1 | 8/2005 | Kemp, II et al. | |
| 7,127,424 B2 | 10/2006 | Kemp, II et al. | |
| 7,212,999 B2 | 5/2007 | Friesen et al. | |
| 7,783,556 B1 | 8/2010 | Singer et al. | |
| 8,788,387 B1 | 7/2014 | Mintz | |

(Continued)

OTHER PUBLICATIONS

QBL Software, "Radar Screen", dated Apr. 13, 2000.

(Continued)

*Primary Examiner* — Robert R Niquette
*Assistant Examiner* — Joseph W. King
(74) *Attorney, Agent, or Firm* — McDonnell Boehnen Hulbert & Berghoff LLP

(57) ABSTRACT

Methods and apparatus to calculate and display transaction adjusted values are disclosed. An example method includes defining an order related to a tradeable object listed on an electronic exchange, wherein the order is associated with a user; determining whether the user qualifies for a pricing incentive that rewards trading activity meeting a threshold; when the user qualifies for the pricing incentive, calculating a transaction adjusted value of the order at respective ones of a plurality of price levels of a trading interface, wherein the pricing incentive is factored into the calculation of the transaction adjusted value for a first one of the price levels, and the pricing incentive is not factored into the calculation of the transaction adjusted value of a second one of the price levels; and displaying ones of the transaction adjusted values in a value axis of the trading interface in connection with respective ones of the plurality of price levels.

12 Claims, 12 Drawing Sheets

(56) References Cited

U.S. PATENT DOCUMENTS

| | | |
|---|---|---|
| 2002/0099644 A1 | 7/2002 | Kemp, II et al. |
| 2003/0004852 A1 | 1/2003 | Burns |
| 2003/0004853 A1 | 1/2003 | Ram et al. |
| 2003/0009414 A1 | 1/2003 | Furbush et al. |
| 2003/0055775 A1 | 3/2003 | McQuain |
| 2004/0117292 A1 | 6/2004 | Brumfield et al. |
| 2005/0192887 A1* | 9/2005 | Triplett .................. G06Q 30/02 705/37 |
| 2011/0145125 A1* | 6/2011 | Foygel ............... G06Q 30/0601 705/37 |
| 2014/0143114 A1* | 5/2014 | Fraser .................... G06Q 30/02 705/37 |
| 2014/0207639 A1 | 7/2014 | Unetich |

OTHER PUBLICATIONS

Star Research Inc., "Profit Loss vs Price", dated Apr. 19, 2001.
U.S. Appl. No. 11/415,884, filed May 2, 2006, now abandoned.
International Search Report and Written Opinion for International App. No. PCT/US2015/065725, dated Feb. 23, 2016.

* cited by examiner

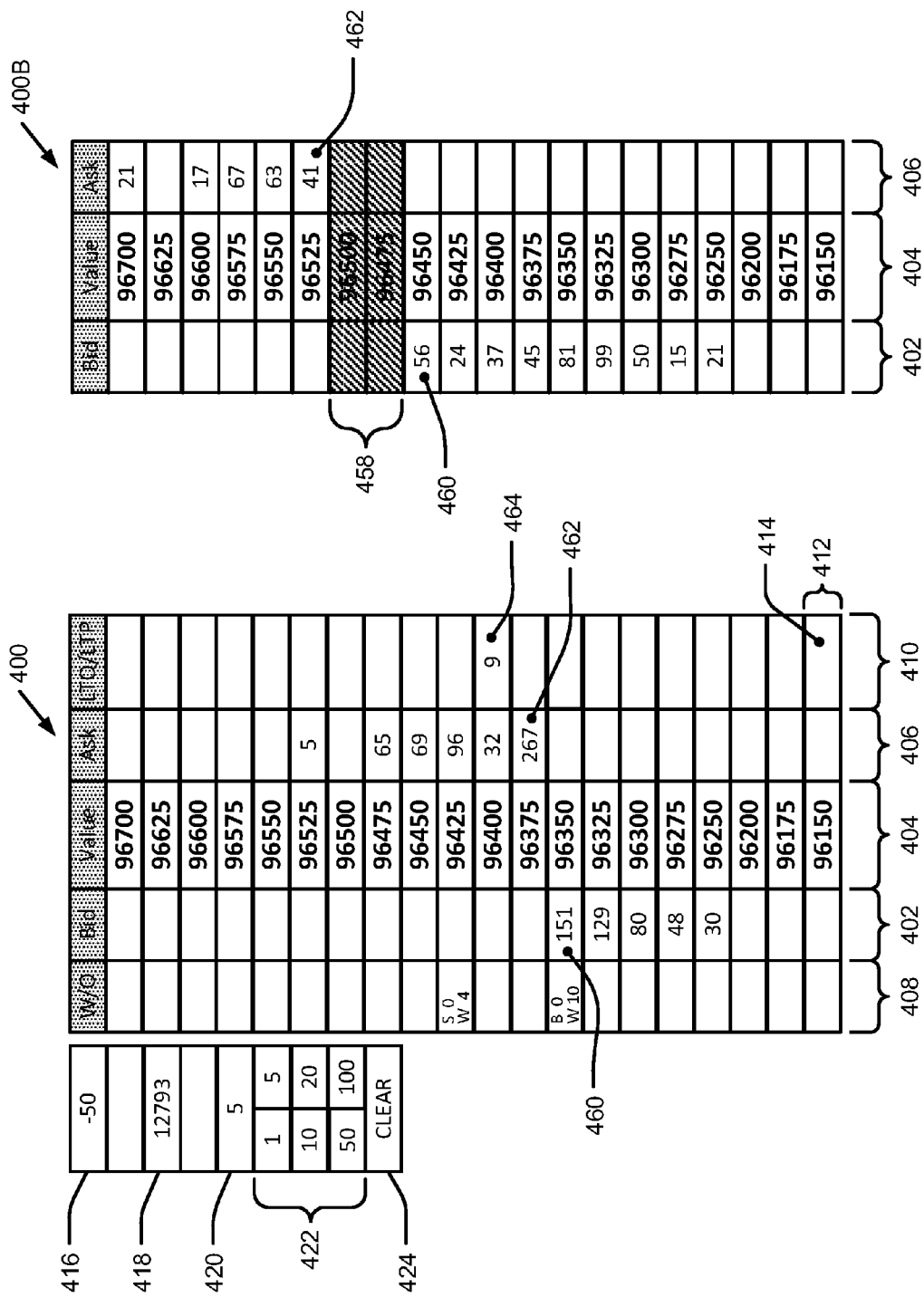

| W/O Bid | W/O Bid | Value | | Ask | Ask LTD |
|---|---|---|---|---|---|
| | | 96700 | +Fees | | |
| | | 96625 | +Fees | | |
| | | 96600 | +Fees | | |
| | | 96575 | +Fees | | |
| | | 96550 | +Fees | | |
| | | 96525 | +Fees | 5 | |
| | | 96500 | +Fees | | |
| | | 96475 | +Fees | 65 | |
| | | 96450 | +Fees | 69 | |
| S 0 W 4 | | 96425 | +Fees | 96 | |
| | 151 | 96400 | +Fees | 32 | 9 |
| B 0 W 10 | 129 | 96375 | +Fees | 267 | |
| | | 96350 | +Fees | | |
| | 80 | 96325 | +Fees | | |
| | 48 | 96300 | +Fees | | |
| | | 96275 | +Fees | | |
| | 30 | 96250 | +Fees | | |
| | | 96200 | +Fees | | |
| | | 96175 | +Fees | | |
| | | 96150 | +Fees | | |

FIG. 7A

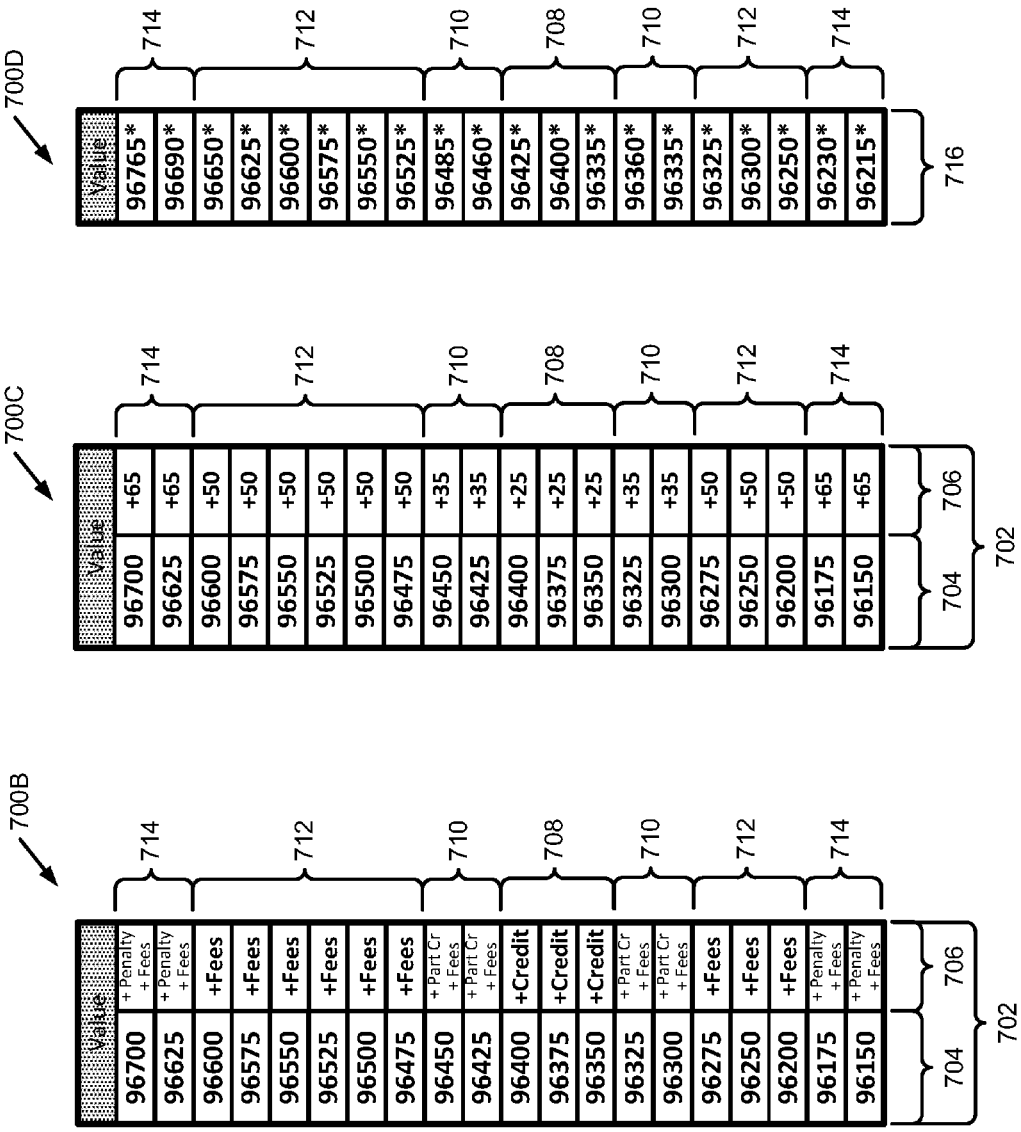

METHODS AND APPARATUS TO CALCULATE AND PRESENT TRANSACTION ADJUSTED VALUES

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The electronic exchange typically charges fees for facilitating the orders. The exchange fees and other cost affect a total or overall cost of the order.

BRIEF DESCRIPTION OF THE FIGURES

Certain embodiments are disclosed with reference to the following drawings.

FIGS. 4A to 4E illustrate block diagrams representative of example trading interfaces in which certain embodiments may be employed.

FIGS. 7A-7D illustrate block diagrams representative of example trading interfaces in which certain embodiments may be employed.

Figure 1:
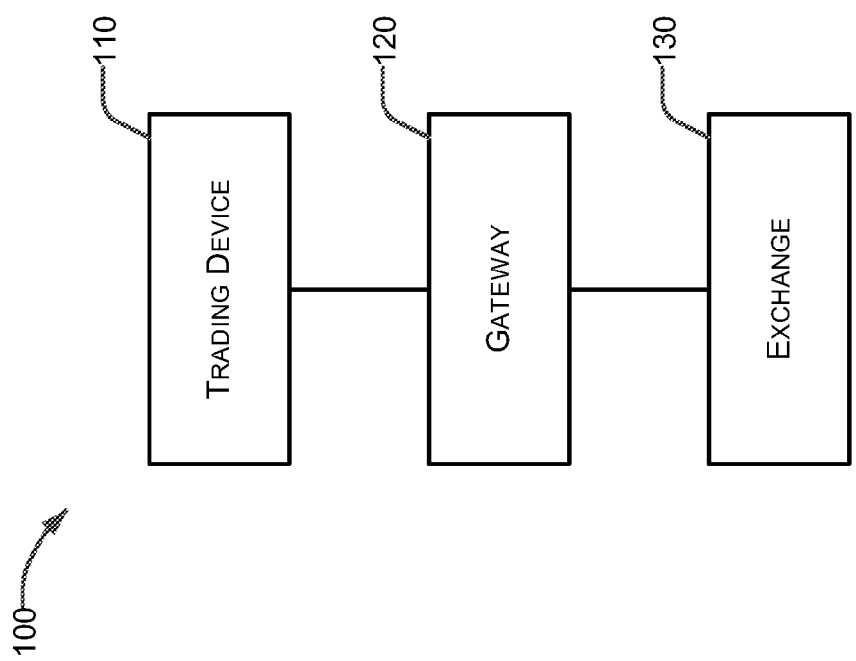
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments related to trading strategies and, more particularly, to methods and apparatus to calculate and present transaction adjusted values.

Some exchanges penalize trading activity that is deemed non-productive or costly to the overall marketplace. For example, orders that are placed and then quickly cancelled add no value to the market and detrimentally consume resources, such as bandwidth or computing cycles. When such low quality trading activity is present in the market, the exchange is hindered in efforts to provide a desirable trading environment and to meet user needs and/or expectations. With a goal of ridding the market of such activity, exchanges impose penalties on activity that crowds and confuses the market, such as excessive quoting orders with near immediate cancellations.

Examples disclosed herein recognize that while penalties likely discourage low quality activity, exchanges further benefit from high quality activity. Put another way, while a reduction of non-productive trading activity (for example, by way of penalties) decreases problematic circumstances such as rapid order cancellations, penalties do not enhance the marketplace beyond a baseline of ordinary, non-harmful trading activity. Examples disclosed herein enhance the market provided by the exchange by incentivizing users to engage in high quality trading activity, such as placement of orders that tend to increase the depth of the market. To incentivize high quality trading activity, examples disclosed herein reward users engaged in such trading activity via pricing incentives such as, for example, reduced fee(s), rebate(s), and/or other types of rewards that reduce a price of a transaction(s). Examples of high quality trading activity include, for example, activity having a high transaction-to-fill ratio, orders that remain in the market for durations greater than a threshold amount of time, orders placed on the inside market (as opposed to off market orders), orders placed in less liquid markets, and/or any other activity that enhances the market provided by the exchange. In some examples disclosed herein, rewarding high quality trading activity is performed in addition to penalizing detrimental trading activity. Alternatively, the pricing incentives disclosed herein are provided without penalizing detrimental trading activity.

Costs associated with utilizing an electronic exchange (for example, co-location fees, transmission costs for different types of media, such as fiber, microwave, etc.) factor into a value or effective price of a transaction. Put another way, an actual value or price of a transaction includes the cost of the tradeable object(s) itself as well as the costs of executing the transaction. The total price of executing an order (including transactional costs and the cost of the underlying products) may be referred to as a transaction adjusted value. Disclosed examples provide calculations and presentations of the transaction adjusted value associated with a specified order ready to be submitted to the exchange but not yet submitted (for example, all information has been inputted but a BUY/SELL button has not been selected). Further, examples disclosed herein use the incentives disclosed herein (and/or penalties imposed by the exchange) to generate a transaction adjusted value for particular orders with the rewards (and/or penalties) factored into the transaction. In some examples, the transaction adjusted value disclosed herein reflects reduction(s) (if any) to the transactional cost of the order stemming from high quality trading activity. In some examples, the transaction adjusted value disclosed herein reflects increase(s) (if any) to the transactional cost of the order stemming from low quality trading activity. In some examples, the transaction adjusted value disclosed herein reflects a combination of reduction(s) to the transactional cost of the order stemming from high quality trading activity and increase(s) to the transactional cost of the order stemming from low quality trading activity. Thus, examples disclosed herein determine a benefit and/or a degree of the benefit earned by placing high quality orders.

When combined with the example pricing incentives disclosed herein, the calculation and presentation of the transaction adjusted value of the order is especially beneficial. When a user is visually exposed to the potential reduced transaction adjusted value of an order (for example, due to pricing incentives), the user is further encouraged to undertake the proposed high quality activity on which the pricing incentive(s) is based. For example, disclosed embodiments include a value axis displayed on a trading interface and including the improvement in the transaction adjusted value provided by the pricing incentives disclosed herein. The value axis of disclosed examples can be adjusted to operate in multiple modes, such as a first mode that displays transaction costs common to the trades in the market and a second mode that displays user specific costs (including the cash equivalent of incentives and/or disincentives).

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

An example disclosed method includes defining an order related to a tradeable object listed on an electronic exchange, wherein the order is associated with a user. The example disclosed method further includes determining whether the user qualifies for a pricing incentive that rewards trading activity meeting a threshold. The example disclosed method further includes, when the user qualifies for the pricing incentive, calculating a transaction adjusted value of the order at respective ones of a plurality of price levels of a trading interface, wherein the pricing incentive is factored into the calculation of the transaction adjusted value for a first one of the price levels, and the pricing incentive is not factored into the calculation of the transaction adjusted value of a second one of the price levels. The example disclosed method further includes displaying ones of the transaction adjusted values in a value axis of the trading interface in connection with respective ones of the plurality of price levels.

An example disclosed tangible computer readable medium includes instructions that, when executed, cause a machine to define an order related to a tradeable object listed on an electronic exchange, wherein the order is associated with a user. The instructions of the example disclosed tangible computer readable further cause the machine to determine whether the user qualifies for a pricing incentive that rewards trading activity meeting a threshold. The instructions of the example disclosed tangible computer readable further cause the machine to, when the user qualifies for the pricing incentive, calculate a transaction adjusted value of the order at respective ones of a plurality of price levels of a trading interface, wherein the pricing incentive is factored into the calculation of the transaction adjusted value for a first one of the price levels, and the pricing incentive is not factored into the calculation of the transaction adjusted value of a second one of the price levels. The instructions of the example disclosed tangible computer readable further cause the machine to display ones of the transaction adjusted values in a value axis of the trading interface in connection with respective ones of the plurality of price levels.

A disclosed example apparatus includes a gathering module to obtain data indicative of a quality of trading activity in which a user is engaged over a period of time. The disclosed example apparatus further includes a plurality of thresholds to be compared to the obtained data to determine whether the user qualifies for a pricing incentive. The disclosed example apparatus further includes a reward applicator to, when the user qualifies for the pricing incentive, calculate a transaction adjusted value of an order at respective ones of a plurality of price levels of a trading interface, wherein the pricing incentive is factored into the calculation of the transaction adjusted value for a first one of the price levels, and the pricing incentive is not factored into the calculation of the transaction adjusted value of a second one of the price levels. The disclosed example apparatus further includes a display module to incorporate ones of the transaction adjusted values in a value axis of the trading interface in connection with respective ones of the plurality of price levels.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
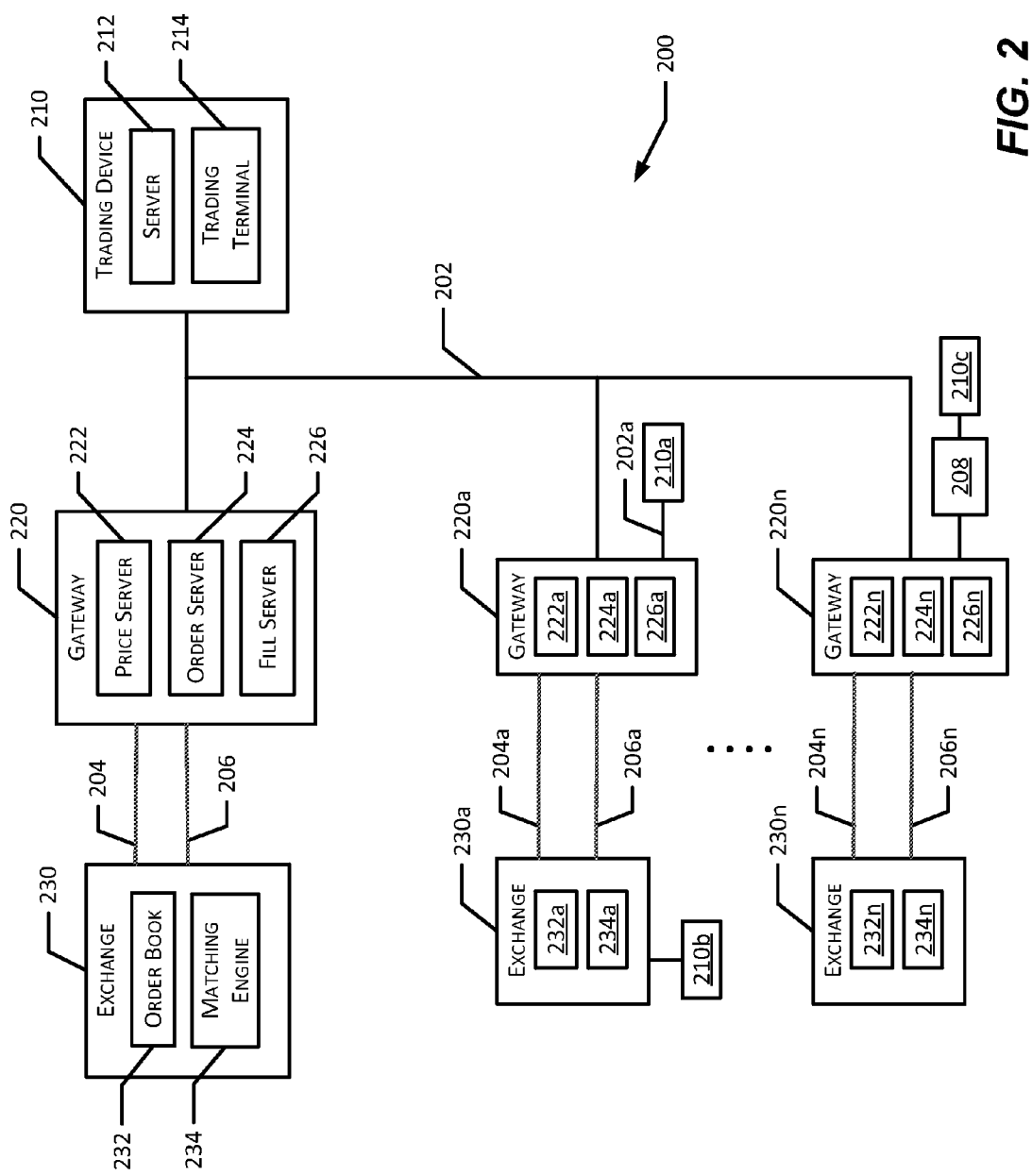
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
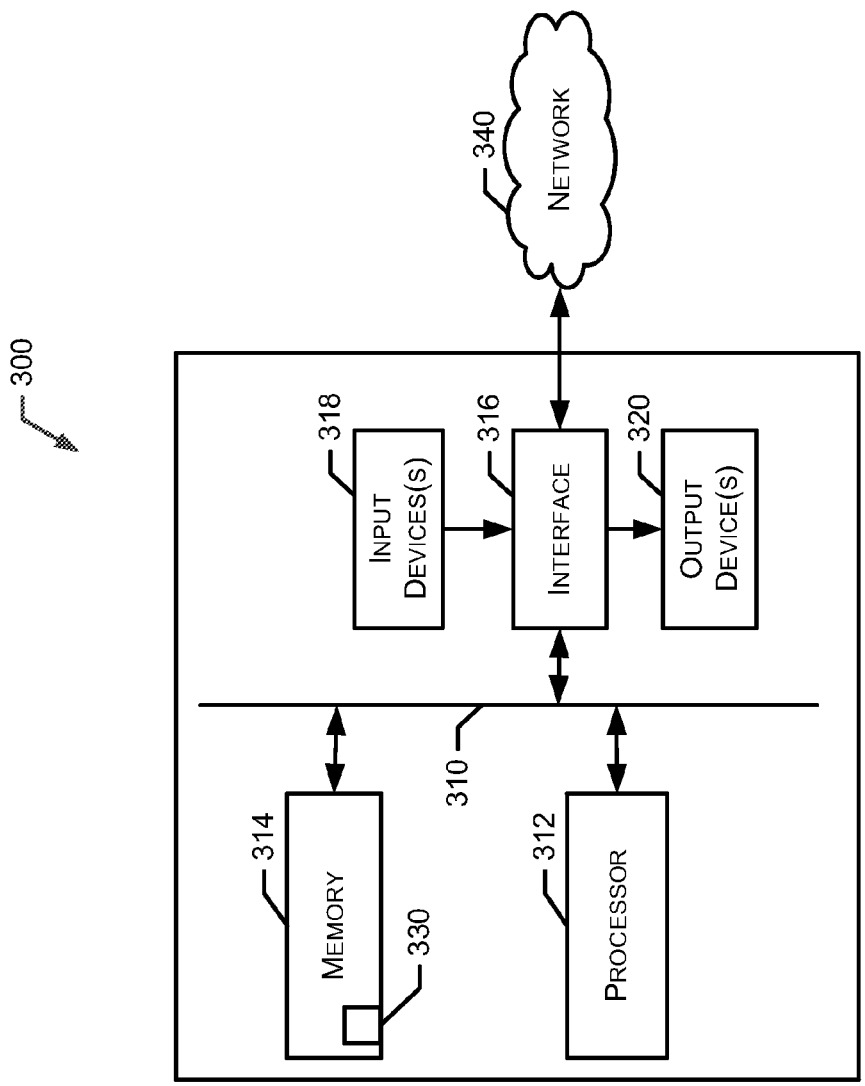
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Trading Interface

FIG. 4A illustrates an example trading interface 400 in which certain embodiments may be employed. The example trading interface 400 shows market data for a tradeable object at a first point in time. While the following examples are described in conjunction with the example electronic trading system 200 of FIG. 2, the examples disclosed herein may be implemented in other electronic trading systems, such as the example trading system 100 of FIG. 1.

As described above in conjunction with FIG. 2, the trading device 210 receives market data related to one or more tradeable objects from the exchange 230 and/or the exchanges 230a-230n through the gateway 220 and/or the gateways 220a-220n, respectively. The trading device 210 provides a trading application including trading tools to process and/or organize the market data and provide the example trading interface 400. Trading tools include, for example, MD TRADER®, X_TRADER®, ADL®, AUTOSPREADER®, and AUTOTRADER™, each provided by Trading Technologies. The trading device 210 provides the trading interface 400 to enable a user to view market data and communicate trade orders and trade actions with an electronic exchange.

In the illustrated example of FIG. 4A, the trading interface 400 includes a bid column 402, a value column 404, and an ask column 406. The trading interface 400 further includes a working order (W/O) column 408 and a last traded quantity (LTQ)/last traded price (LTP) column 410. The trading interface 400 may include other columns such as an estimated position in queue (EPIQ) column, a single combined bid/ask column, a user-defined indicator column, an inside market indicator column, and/or any other column for providing indicators. The trading interface 400 also includes rows such as row 412. The columns intersect with the rows to define cells such as cell 414. In other embodiments, different orientations other than vertical columns may be used (e.g., horizontal and diagonal arrangements).

In the illustrated example, bid indicators representing the bid quantities of the tradeable object are displayed in the bid column 402, value indicators corresponding to value levels are displayed in the value column 404, and ask indicators representing the ask quantities of the tradeable object are displayed in the ask column 406. A bid quantity is a quantity available on the bid side of the tradeable object at a given value level. The value levels can be configured to represent prices, net change, derivatives of price, consolidated prices, synthetic tradeable object pricing, spread pricing, and/or other representations of value. The ask quantity is a quantity available on the ask side of the tradeable object at a given value level. The indicators are not limited to numerical values and can include any type or combination of indicator or symbol to illustrate the presence of available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available. In another example, the indicators may represent simply that there is quantity available with no illustration of the amount in excess of zero.

Trading interfaces, such as the trading interface 400, may include indicators to identify the inside market. The inside market indicators may utilize multiple representations to identify the highest bid price and the lowest ask price. The inside markets indicators may also include additional information such as information related to quantities at the inside market. Examples of inside market indicators include a best bid price indicator representing the highest available bid price, a best ask price indicator representing the lowest available ask price, and/or an indicator representing a range between the highest available bid price and the lowest available ask price. As shown in FIG. 4B, the inside market indicator may highlight and identify the range 458 of value levels between the highest available bid price of "96450" and the lowest available ask price of "96525". Inside market indicators may be displayed within the trading interface to identify specific value level(s) in the value column 404. For example, a best bid price indicator may be displayed in a cell containing a bid quantity indicator and corresponding to a value level that reflects the best bid price. As another example, a best ask price indicator may be a color or symbol combined with an ask quantity indicator in the ask column 406 in a cell corresponding to a value level that reflects the best ask price. As another example, inside market indicators may be displayed at value levels within the value column 404 that reflect the best bid price and the best ask price. The inside market indicators can include any type or combination of indicator or symbol (e.g., the indicators may include text, icons, colors, lines, and/or other graphical representations).

In certain embodiments, the inside market indicators may be provided by the presence of a quantity indicator. The presence of a quantity indicator refers to the existence and location of the quantity indicator. For example, the presence of the best bid quantity indicator, independent of the quantity value displayed at any given point in time, in the bid column may be the best bid price indicator. Thus, the existence of a quantity indicator at the highest value level in the bid column is the best bid price indicator. To be clear, in this example, the value of the bid quantity indicator is not part of the best bid price indicator. Rather, the existence of the bid quantity indicator itself at the highest value level in the bid column is the best bid price indicator. In other words, the display of the highest bid quantity indicator is the best bid price indicator. As shown in FIG. 4A, the presence of the bid quantity indicator "151" at the highest value level in the bid column at the price of "96350" is the best bid price indicator 460. Similarly, the presence of the ask quantity indicator "267" at the lowest value level in the ask column at the price of "96375" is the best ask price indicator 462.

From the user's perspective, the trading interface 400 may present and display indicators, such as inside market and LTP/LTQ indicators, in a manner that conveys the appearance of movement relative to the value column 404. For example, the manner in which the trading interface alters the position of the best bid price indicator and the best ask price indicator relative to the value levels within the value column may allow the user to perceive changes in both the speed and direction of trading within a market. The trading interface 400 updates based on received market data. For example, the trading interface 400 moves the best bid price indicator 460 relative to the value column 404 when the received market data includes a quantity at a new highest bid price. As another example, the trading interface 400 moves a LTP indicator 464 (shown in the LTQ column 410 of FIG. 4A) relative to the value column 404 when the received market data includes a new last traded price.

The trading interface 400 shown in FIG. 4A depicts and identifies the inside market via the best bid price indicator 460 aligned with the highest available bid price and the best ask price indicator 462 aligned with the lowest available ask price at a first point in time. For example, the best bid price indicator 460 is moved to reflect the change in the best bid price from "96350" (FIG. 4A) to "96450" (FIG. 4B). Similarly, the best ask price indicator 462 is moved to reflect the change in the best ask price from "96375" to "96525". By observing the movement of the inside market indicators relative to the value column 404 in the described manner, the user can quickly perceive that the market is trading higher.

Moreover, as illustrated in the trading interface 400 shown in FIG. 4A, the bid quantity indicator "151" is at the best bid price "96350" and the ask quantity indicator "267" is at the best ask price "96375". At the second point in time, the displayed quantity indicators are updated to reflect new quantities available. As shown in FIG. 4B, the bid quantity indicator "56" is at the best bid price "96450" and the ask quantity indicator "41" is at the best ask price "96525". Although the quantity values have changed, it is the presence of the bid quantity indicator at the highest value level in the bid column and the presence of the ask quantity indicator at the lowest value level that are the inside market indicators.

From the user's perspective, indicators may appear to move relative to the value column 404. This appearance of movement may result from painting an indicator in a new location on the trading interface 400 or painting over to remove an indicator from the trading interface 400. Painting may include drawing on a surface, multilayer compositing, or other rendering techniques. For example, in the bid column 402, painting a new quantity indicator above the current best bid quantity indicator creates the appearance of upward movement to inform the user that the market has moved. In another example, in the ask column 406, painting over the best ask quantity indicator to remove it from the trading interface 400 results in the appearance of upward movement in the market. As another example, other indicators such as the LTP indicator 464 can appear to move relative to the value column 404 using these techniques.

The movement of the indicators relative to the value column 404 may be implemented in a variety of ways. In certain embodiments, movement of an indicator includes repositioning the indicator from one location to another location. For example, the best bid price indicator may be a graphical user interface element or object, such as a line, shape, arrow, or sprite, the on-screen position of which is changed to a new location representing a new best bid price. In certain embodiments, movement of an indicator includes removing the indicator at one location and replacing it with a new indicator at another location, which as user may perceive as the appearance of movement. For example, the best bid price indicator may be a yellow background color for a cell in the value column 404. When the best bid price changes, the background color for the cell is changed to default color (e.g., black) and the background color of a second cell associated with the new best bid price is changed to yellow to provide the new best bid price indicator. In certain embodiments, the object representing the best bid price indicator may change from one location to another location. For example, the value, color and/or shape of the best bid price indicator may change from one location to another location.

When quantity information is displayed in relation to the value column 404 and the market moves up or down, the inside market indicators can be said to "move" up or down from the user's perspective in relation to the value column 404 to reflect a new highest bid price or a new lowest ask price. For example, when the quantity indicators are represented with numerical values and the inside market indicators are provided by the presence of the highest bid quantity indicator and lowest ask quantity indicator, the exact numeric value representing the quantity at the best bid price or the best ask price need not move or provide the appearance of movement. The quantity indicators, in this particular example, at those particular price levels may have changed, but they do not actually move—it is the best bid indicator that has "moved."

The value indicators in the value column 404 may be repositioned. A selected value indicator may be repositioned to a designated location and other value indicators are repositioned relative to the selected value indicator. The selected value indicator may be based on, for example, a user selection or market related values such as the highest bid price or lowest ask price, LTP, and a calculated average of the best bid and best ask prices. The designated location may be a pre-determined location or a location defined by a user. In one configuration, in response to the repositioning command, the selected value indicator may be moved to the designated location corresponding to the middle of the display (e.g., to a location corresponding substantially to the midpoint of the length of the value column 404). In another configuration, in response to the repositioning command, the selected value indicator can be displayed at a user-identified or pre-defined position within the display. From a user's perspective, repositioning is the appearance of movement of values in the value column 404 to new locations in the value column 404. This appearance of movement may result from repainting the values in the value column 404.

The value indicators in the value column 404 may be repositioned in response to various commands or triggering conditions. In one example, the value indicators displayed in the value column 404 may be repositioned in response to a triggering condition. Some examples of a triggering condition include: a user input; expiration of an alarm or timer; a determination that the inside market is, or may be, moving off the display; a determination that the inside market has exceeded an upper threshold or a lower threshold; an event in another trading interface; a market event relating to the same or a different tradeable object; a user-defined event; and/or a determination that a value exceeds a threshold.

In some examples, an indicator based on market data (such as best bid, best ask, LTP) may be displayed at the same fixed location in the trading interface 400. For example, the best bid indicator in the bid column 402 may be displayed at a specified fixed location. The fixed location may be pre-determined or defined by a user. For example, the best bid indicator and/or the best ask indicator may, for example, be maintained at the center of the display, at the top of the display, at the bottom of the display or any designated location.

In the illustrated example, the values, which are prices, are displayed without decimal points (which may be a format or convention expected by a user) and in descending order from a top to a bottom of the value column 404 in the orientation of FIG. 4A. In other examples, the prices are listed in other orders (e.g., ascending order from top to bottom) and/or formats (e.g., with decimal points, fractions, in scientific notation, and/or any other format).

In the illustrated example, the indicators in the bid column 402 and the ask column 406 are updated to indicate quantity changes at each value level identified along the value column 404. For example, values of the ask quantities and/or the bid quantities may increase or decrease due to order quantities being added, deleted or matched at each value level. The indicators may be updated based on a timer and/or in response to new data being received, for example.

In some examples, the trading interface 400 includes additional and/or different information. In the illustrated example, the trading interface 400 also displays a net price change 416 of the tradeable object over a given amount of time (e.g., since the market opened on a given day). The trading interface 400 also includes a total volume 418 of the tradeable object (e.g., a number of lots that have been traded). Other embodiments may include different and/or additional information.

The trading interface 400 also enables the user to specify parameters for a trade order. In the illustrated example, the trading interface 400 includes a quantity field 420. The quantity field 420 displays a quantity (e.g., 5) for an order that the user will send to market, and the user may adjust the quantity by selecting (e.g., via a mouse) one of a plurality of buttons 422 adjacent the quantity field 420 or entering a new value into the quantity field 420. If the user selects a button 424 labeled "CLEAR" in the illustrated example, the quantity field 420 is cleared (e.g., the quantity displayed in the quantity field 420 is adjusted to be zero).

The trading interface 400 further enables the user to enter an order to buy or sell a tradeable object via an order entry area configured to receive a selection and in response initiate placement of the order. Selection of an order area may be by a single action of an input device such as a single click, a double click, or a multi-touch gesture. Initiating placement of an order may include preparing a message to send an order to an exchange or sending an order to an electronic exchange. The trading interface 400 may include multiple order entry areas. The trading interface 400 may request that a user confirm an order to be placed prior to sending it.

Order entry areas may overlap or encompass one or more regions of a trading interface. For example, an order entry area may overlap all or part of the cells making up a row. As another example, an order entry area may overlap all or part of the cells in a column such as the bid column, ask column or value column. In another example, an order entry area may overlap a cell and a region outside of the cell. In certain embodiments, a trading interface may include a first order entry area overlapping first cell and a second order entry area overlapping a second cell. In certain embodiments, a first order entry area overlaps a first cell and a portion of a second cell, and a second order entry area overlaps a portion of the second cell and a third cell. In certain embodiments, order entry areas may encompass other regions of the trading interface.

Each order entry area may align with a value level. For example, an order entry area may be aligned with one of the value levels making up the value column 404. In another example, an order entry area may be independent of and not aligned with a value level.

An order entry area may be linked to other elements of the trading interface 400. For example, an order entry area may be linked to a particular value level making up a value column by specifying a value level followed by specifying an order entry area. Subsequently, selection of the linked order entry initiates placement of the order based on the linked value. As another example, selection of a cell associated with a particular value level may link a pre-defined order entry area to the particular value level.

Upon selection of an order entry area to initiate placement of an order, one or more parameters of the order may be determined based on the selected order entry area. Order parameters may include order price, order quantity, order side, and/or order type. Other order parameters may be specified. Values for the parameters may be default values, preconfigured values, previously determined values, values set based on the location of the selection within the order entry area, values set based on the location of the order entry area, values set based on the method of the selection (e.g., a left click, a right click, a keyboard entry and a double click).

The manner in which the selection of an order entry area is made may affect the type of order or the way in which placement of an order is initiated. For example, selection within a row configured as an order entry area may include correlating the position of the selection to a specific cell or column arranged and aligned relative to the order entry area. The type of single action provided via the input device may further specify the selection. For example, if the user initiates a single action corresponding to a right click within an order entry area aligned with a portion of the row corresponding to a cell in the value column, then the selection may initiate placement of a buy order. Similarly, if the user initiates a single action corresponding to a left click over a portion of the row corresponding to a cell in the value column, then the selection may initiate placement of a sell order. As another example, selecting an order entry area encompassing the cells in the bid column may initiate placement of a buy market order when the selection is a single point touch applied to a touch sensitive interface and a buy sweep order when the selection is a two point touch to the touch sensitive interface.

Figure 4C:
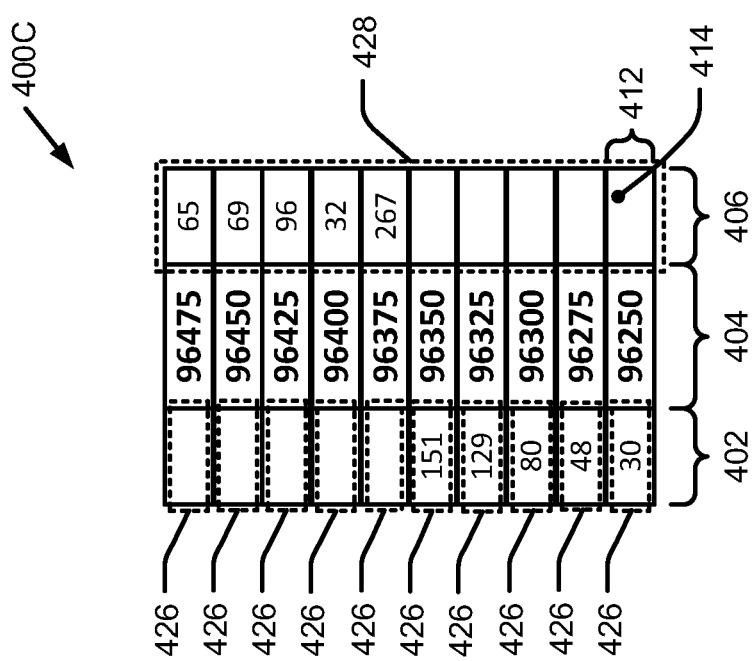
Figure 4D:
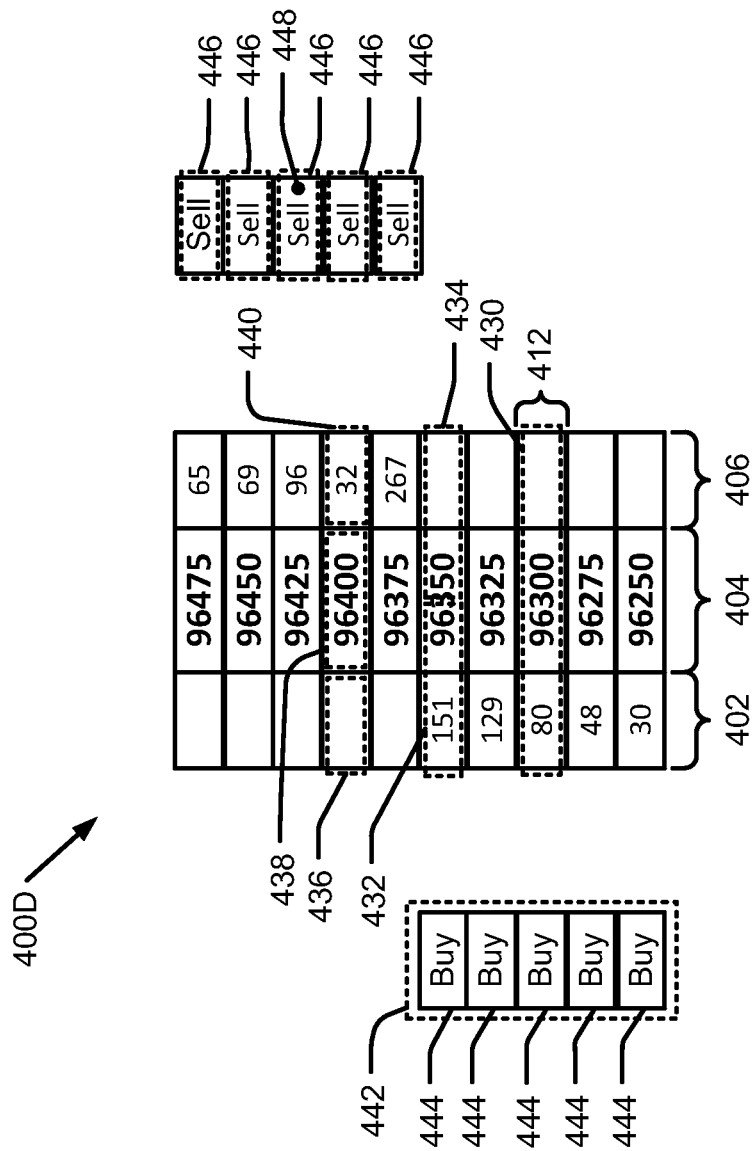
Figure 4E:
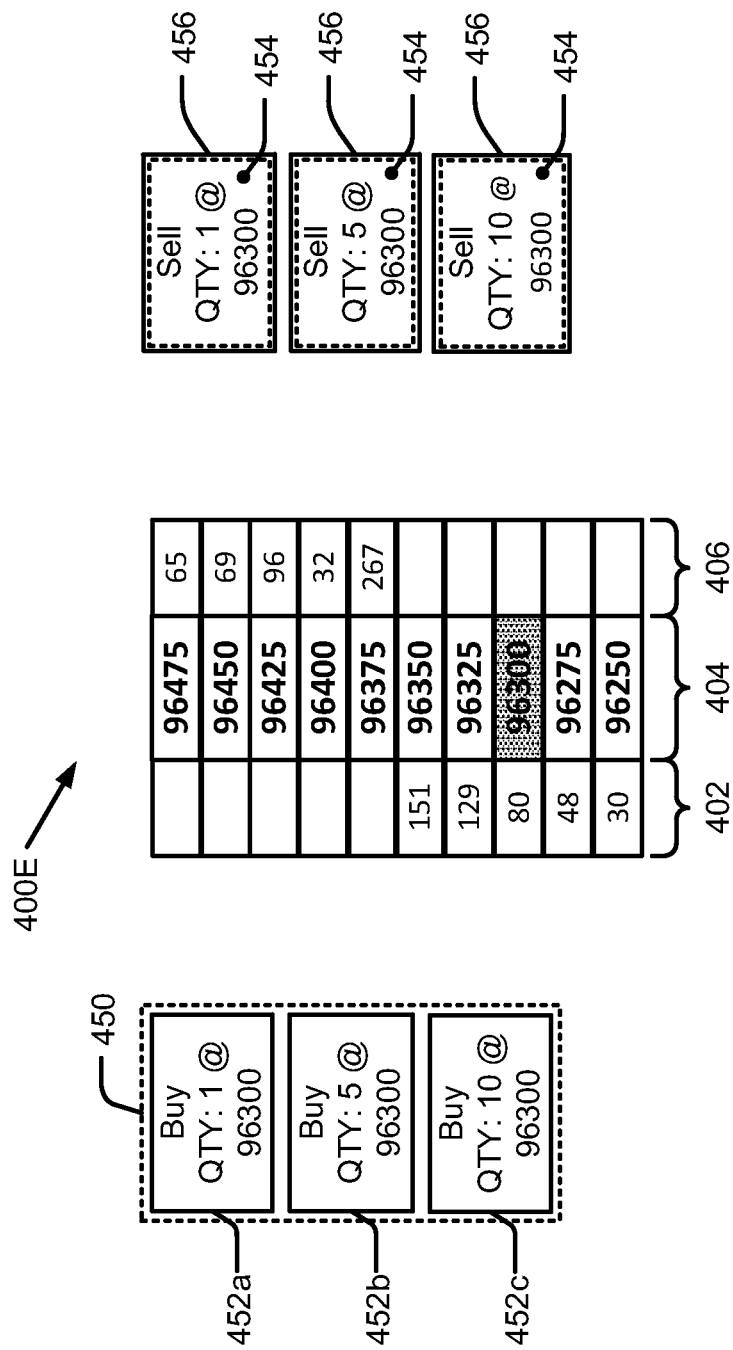

FIGS. 4C to 4E illustrates examples of order entry area configurations that may be utilized to initiate placement of an order. FIG. 4C illustrates one configuration of a trading interface (identified as trading interface 400B) including order entry areas overlapping each cell making up a column. For example, selection of a particular order entry area 426 in bid column 402 may initiate placement of an order to buy a default quantity at the value level aligned with the selected order entry area. In operation, when the user selects an order entry area 426 overlapping the cell containing the bid quantity "80" in the illustrated example, the trading device 210 sends an order to sell a default quantity of 4 displayed in the quantity field 420 (see FIG. 4A) at a price of "96300".

FIG. 4C further illustrates another configuration of the trading interface 400C including an order entry area overlapping an entire column. For example, selection within a portion of the order entry area 428 overlapping the ask column 406 initiates placement of an order to sell a default quantity at the value level corresponding to the selected portion of the order entry area. In operation, when the user selects within the order entry area 428 at a location corresponding to the cell displaying the ask quantity "69" in the illustrated example, the trading device 210 sends an order to buy a default quantity of 5 displayed in the quantity field 420 at a price of "96450".

FIG. 4D illustrates another configuration of a trading interface (identified as trading interface 400D) including order entry areas overlapping cells defined within one or more of the columns in the same row. For example, an order entry area 430 may overlap a row 412 containing cells within each of the columns 402 to 406. In operation, selection within any portion of the order entry area 430 overlapping the row 412 initiates placement of an order to either buy or sell a default quantity at a price of "96300". Determination of the side (e.g., buy or sell) of the order may be based on the method of the selection (e.g., a left click to initiate a buy order and a right click to initiate a sell order) and/or the position at which the selection was made (e.g., within a portion of the order entry area overlapping the buy column 402, within a portion of the value column 404 closer to the ask column 406. In another example, a first order entry area 432 overlaps a first cell in column 402 and part of a second cell in column 404, and a second order entry area 434 overlaps part of the second cell in column 404 and a third cell in column 406. In another example, individual order entry areas 436, 438 and 440 overlap aligned cells in each of the columns 402, 404 and 406.

FIG. 4D further illustrates order entry areas overlapping other elements of the trading interface 400D and aligned with the value levels of the value column. For example, an order entry area 442 encompasses multiple "Buy" elements 444 where each element 444 is aligned with a value level of the value column 404. In operation, selection within the order entry area 442 initiates placement of an order to buy a default quantity of the tradeable object. The order is at the price associated with the value level aligned with the element 444 at the location of the selection. In another example, order entry areas 446 overlay each individual "Sell" element 448, where each element 448 is aligned with a value level of the value column 404. In operation, selection of an order entry area 446 aligned with the cell in the value column 404 displaying the price "96425" results in a sell order for a default quantity being sent at the value level associated with the aligned cell.

FIG. 4E illustrates another configuration of a trading interface (identified as trading interface 400E) including order entry areas overlapping elements not aligned with the value levels of the value column. For example, an order entry area 450 encompasses multiple "Buy" elements 452a-452c configured to display different pre-set quantity levels and the currently selected price level. In operation, selection of a value level corresponding to the cell displaying the price "96300" links the selected value level with the order entry area 450. Another selection of a portion of order entry area 450 overlaying the element 452b results in a buy order for a quantity of 5 being sent at the linked price. Similarly, individualized order entry areas 454 overlaying "Sell" elements 456 may be selected to initiate placement of a sell order at a pre-defined quantity associated with the corresponding element 456 at the linked price.

VI. Incentivized Transaction Adjusted Values

Figure 5:
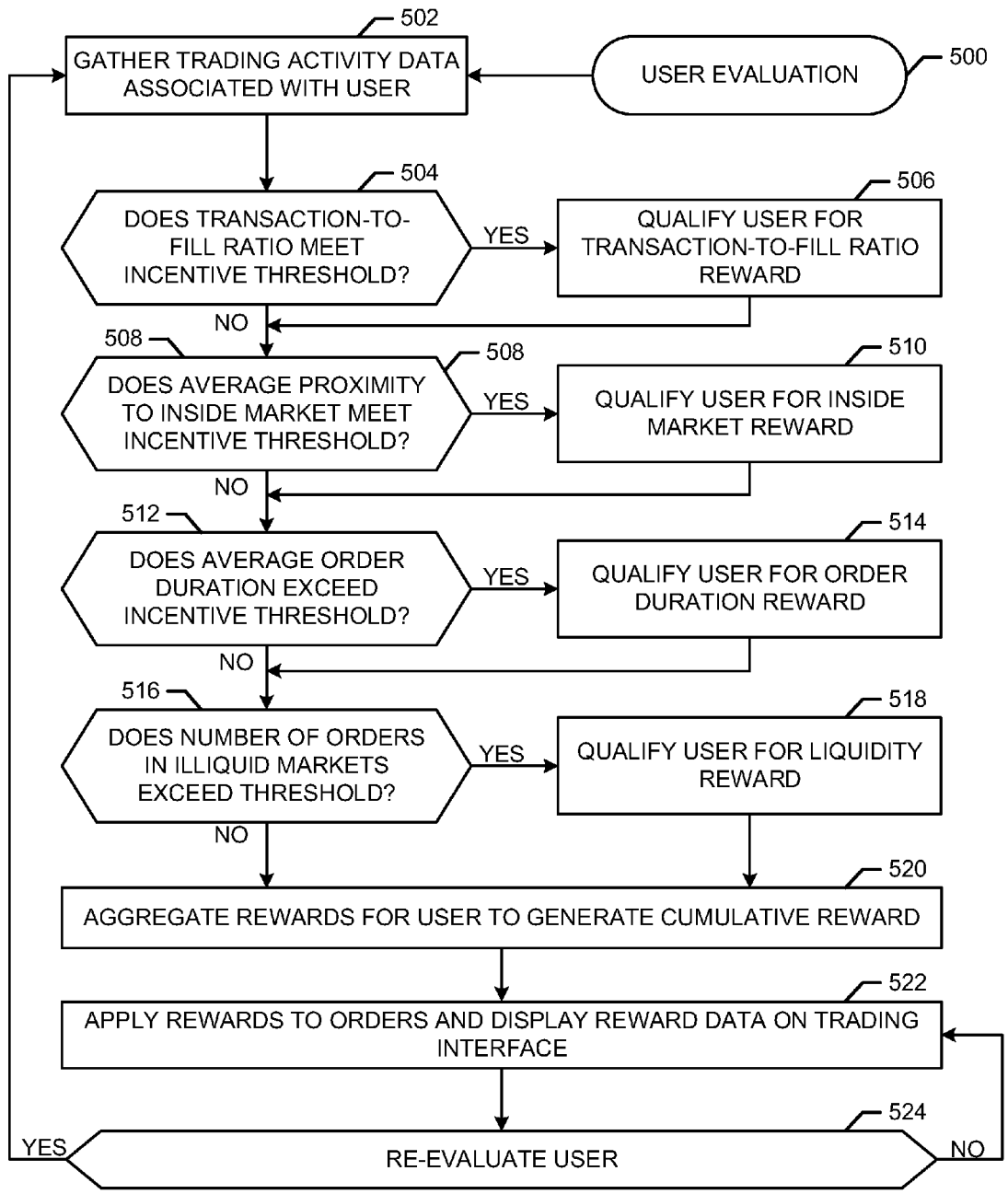
FIG. 5 is a flowchart representative of example machine readable instructions that may be executed to implement disclosed embodiments.
Figure 6:
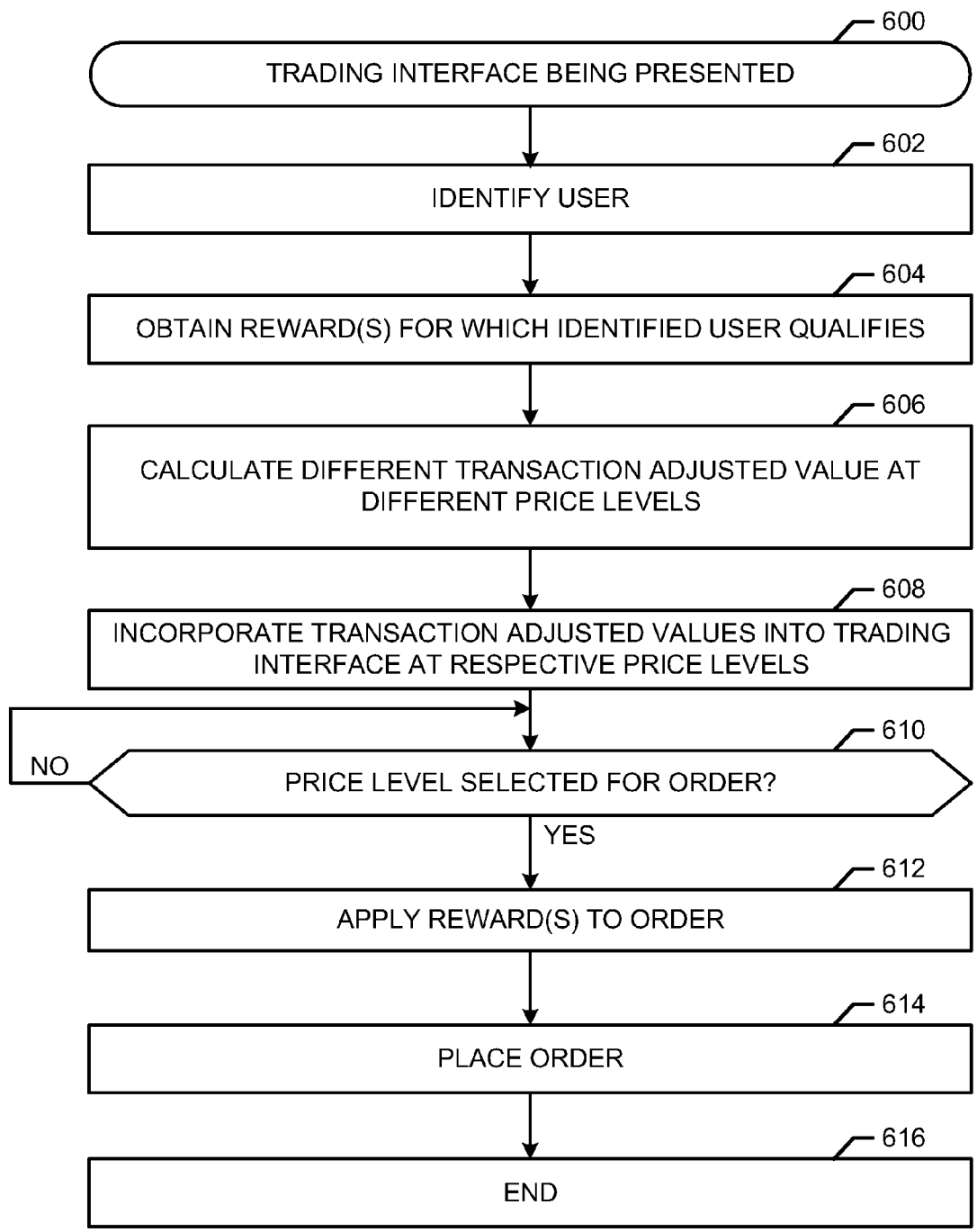
FIG. 6 is a flowchart representative of example machine readable instructions that may be executed to implement disclosed embodiments.

FIGS. 5 and 6 are flowcharts representative of example operations that can be executed to implement the teachings of this disclosure in connection with a trading strategy. FIGS. 7A-7D illustrate example trading interfaces associated with the example operations of FIGS. 5 and/or 6. The example operations of FIGS. 5 and 6 and/or the example trading interfaces of FIGS. 7A-7D can be implemented by, for example, the trading application 330 stored on and executed by the example trading device 110 of FIG. 1 and/or the example trading device 210 of FIG. 2. Additionally or alternatively, the example operations of FIGS. 5 and 6 and/or the example trading interfaces of FIGS. 7A-7D can be implemented by the example exchange 130 of FIG. 1 and/or the example exchange 230 of FIG. 2. While the example trading device 110 of FIG. 1 is described as implementing the example operations of FIGS. 5 and 6 and the example trading interfaces of FIGS. 7A-7D below, any suitable device can implement the example operations of FIGS. 5 and/or 6 and/or the example trading interfaces of FIGS. 7A-7D.

The examples of FIGS. 5, 6, 7A-7D and 8 provide calculations and presentations of incentivized transaction adjusted values. The examples of FIGS. 5, 6, 7A-7D and 8 reward users engaged in high quality trading activity by, for example, providing one or more rewards in connection with one or more orders. In the illustrated examples, the incentivizing rewards include reduction(s) in fee(s) imposed by an exchange, such that the transactional cost(s) of a trade order are lessened. As the reduction in transactional cost affects the overall value of the corresponding order, the examples of FIGS. 5, 6, 7A-7D and 8 determine and present the transaction adjusted value of an order (for example, an order that has been placed or an order that is about to be placed). Accordingly, the exchange benefits from receiving more high quality orders and the users benefit from the reduction fees and clearer understanding of the actual transactional costs of orders.

The example of FIG. 5 begins with a particular user being evaluated for potential rewards disclosed herein (block 500). In the illustrated example, the user is an individual and the trading activity of the individual is analyzed. However, the example evaluation of FIG. 5 may be applied to a group of individuals, such as users affiliated by way of working at a same company or firm. In such instances, individuals of the group may be further encouraged to engage in high quality trading activity, so as to be responsible for group-wide benefits. Additionally or alternatively, the example evaluation of FIG. 5 may be applied to a user account, such as a brokerage account.

To begin the example evaluation of FIG. 5, data indicative of the trading activity of the evaluated user are collected (block 502). Examples of the gathered data are described below. The gathered data of FIG. 5 corresponds to one or more periods of time, such as the most recent month. Additionally or alternatively, the gathered information of FIG. 5 corresponds to a number of orders, such as the most recent one thousand orders. Additionally or alternatively, the time period and/or number of order to be analyzed may depend on the type of orders being placed. That is, a first period of time may be used for a first type of order and/or a first type of market, while a second period of time different than the first period of time may be used for a second type of order and/or a second type of market. Any suitable amount and/or type of user-specific data can be gathered to obtain an understanding of the trading activity of the user.

In the example of FIG. 5, the gathered data includes a transaction-to-fill ratio associated with the user. In some examples, the components on which the transaction-to-fill ratio is gathered and the example of FIG. 5 includes generating the transaction-to-fill ratio for the user. In the illustrated example, the transaction-to-fill ratio represents an aggregation of orders (for example, quotes, deletions, cancellations, etc.) placed by the user divided by total number of fills obtained by the user. A transaction-to-fill ratio near a value of one (1.0) indicates that the user is not generating much detrimental noise (for example, off market orders and/or orders that are quickly cancelled) in the marketplace. A high transaction-to-fill ratio indicates the user is submitting a large number of transactions which are not being filled and the user may be cancelling a large number of orders relative to a number of orders which are filled. Thus, a user having a high transaction-to-fill consumes exchange and network resources without adding any benefit to the marketplace. In the example of FIG. 5, a pricing incentive is provided for users meeting a threshold transaction-to-fill ratio (for example, a value near one (1.0)). When the gathered data indicates that the user has a transaction-to-fill ratio meeting the threshold (block 504), the user is qualified for the pricing incentive corresponding to the transaction-to-fill ratio (block 506). Qualifying the user for the pricing incentive includes, for example, setting a flag in connection with an identifier associated with the user in a database and/or with the exchange. The pricing incentive for meeting the threshold transaction-to-fill ratio is, for example, a 0.02% decrease in transaction costs imposed by the exchange. When the gathered data indicates that the user does not have transaction-to-fill ratio meeting the threshold (block 504), the user is not qualified for the pricing incentive.

In the example of FIG. 5, the gathered data includes an average proximity to an inside market which, as described above in connection with FIGS. 4A-4E, represents an area of the market at which ask values and bid values intersect, overlap and/or approach each other. Because orders placed near the inside market have a greater likelihood of being filled, such orders are more beneficial to the marketplace than orders placed off market or far away from the inside market. Thus, users tending to place orders at or near the inside market are considered to be engaged in high quality trading activity. In the example of FIG. 5, a pricing incentive is provided for users having an average proximity to the inside market meeting a threshold. The threshold includes, for example, a number of price levels from the inside market. When the gathered data indicates that the user has an average (or other mathematical representation of behavior) proximity to the inside market meeting the threshold number of pricing levels (block 508), the user is qualified for the pricing incentive corresponding to the inside market proximity (block 510). Qualifying the user for the inside market proximity pricing incentive includes, for example, setting a flag in connection with an identifier associated with the user in a database and/or with the exchange. The pricing incentive for meeting the threshold number of pricing levels is, for examples, a 0.02% reduction in transaction costs imposed by the exchange. When the gathered data indicates that the user does not meet the threshold (block 508), the user is not qualified for the pricing incentive.

In the example of FIG. 5, the gathered data includes an average order duration representative of how long orders placed by the user typically remain in the market. An order in the market for one-hundred (100) milliseconds (ms) should be valued more than an order in the market for ten (10) ms because the on-hundred (100) ms order has a greater likelihood of being matched. Thus, users tending to leave orders in the market for greater durations are considered to be engaged in high quality trading activity. In the example of FIG. 5, a pricing incentive is provided for users having average order duration above a threshold amount of time. In some examples, the threshold amount of time depends on a type of the order and/or a type of the market in which the order is placed. In such instances, the threshold may be a weighted average amount of time commensurate with the respective percentages of the respective types of orders and/or markets in the gathered data. When the gathered data indicates that the user has an average order duration meeting the threshold amount of time (block 512), the user is qualified for the pricing incentive corresponding to the order duration (block 514). Qualifying the user for the order duration pricing incentive includes, for example, setting a flag in connection with an identifier associated with the user in a database and/or with the exchange. The pricing incentive for meeting the order duration is, for examples, a 0.04% reduction in transaction costs imposed by the exchange. When the gathered data indicates that the user does not meet the threshold (block 512), the user is not qualified for the pricing incentive.

In the example of FIG. 5, the gathered data includes a number of orders placed in illiquid markets. In such examples, markets are considered illiquid based on, for example, volume associated with the market being below a threshold. Orders placed in illiquid markets are considered beneficial to the marketplace. For example, an order placed in a third contract of an E-mini should be valued higher than an order placed in a front month of the E-mini. In the example of FIG. 5, a pricing incentive is provided for users having placed a threshold number of orders in illiquid markets. When the gathered data indicates that the user has placed the threshold number of orders in illiquid markets (block 516), the user is qualified for the pricing incentive corresponding to the liquidity measurements (block 518). Qualifying the user for the liquidity pricing incentive includes, for example, setting a flag in connection with an identifier associated with the user in a database and/or with the exchange. The pricing incentive for meeting the illiquid order threshold is, for examples, a 0.015% reduction in transaction costs imposed by the exchange. When the gathered data indicates that the user does not meet the threshold (block 516), the user is not qualified for the pricing incentive.

While blocks 504-518 illustrate example pricing incentives and example thresholds, additional or alternative pricing incentives and/or thresholds are possible. In the illustrated example, when the user has qualified for multiple pricing incentives, the corresponding rewards are aggregated to form a total or cumulative reward (block 520). The cumulative reward includes, for example, a weighted average of the individual rewards that results in, for example, a discount percentage. With an individual reward or the cumulative reward set for the user, the example of FIG. 5 applies the reward to orders placed by the user at, for example, the exchange (block 522). In the illustrated example, application of the reward applies equally across all orders placed by the user while the user is qualified for the reward. In some examples, the reward is applied selectively to, for example, orders meeting one or more criteria.

In the illustrated example of FIG. 5, application of the reward to the orders placed by the user involves calculating a transaction adjusted value that reflects the benefit received via the rewards (block 522). For example, an order for a quantity of ten units of a tradeable object at $10 per unit has a cost of $100 for the order. Assume that the default transaction cost of the order is five percent (5.0%), making the total cost of the order $105. Also assume that the user is currently qualified for a discount of one percent (1.0%) on the transaction cost based on recent high quality trading activity. The example application of the reward in FIG. 5 includes determining that the transaction adjust value of the order is $104. This transaction adjusted value is displayed to the user in the form of the total cost, a reduction in transaction cost, and/or any other additional or alternative type of display (block 522). Put another way, the example of FIG. 5 includes calculating a user-specific (transaction adjusted) value or cost of a potential trade and displaying the user-specific value or cost on, for example, a trading interface (as illustrated in FIGS. 7A-7D and discussed below). In some examples, the cost or value of the potential trade with the benefit of the reward(s) is shown along with the cost or value of the potential trade without the benefit of the reward(s) to demonstrate the pricing incentive to the user. Additional and alternative display techniques are disclosed below.

In the example of FIG. 5, the user is periodically re-evaluated according to, for example, a schedule and/or an amount of trading activity. That is, the user may be re-evaluated for the pricing incentives after an elapsed amount of time and/or after a particular amount of trading activity (for example, a number of transactions and/or placed orders). If the user is not up for re-evaluation (block 524), control passes to block 522 and the qualified reward(s) are applied to orders placed by the user. If the user is up for re-evaluation, control passes to block 502 and new trading activity data is gathered.

FIG. 6 illustrates example operations to calculate transaction adjusted values differently at different price levels and to present the same to the user on example trading devices. FIG. 6 is described below in connection with the example trading interfaces 700A-700D of FIGS. 7A-7D. However, additional or alternative trading interfaces may be implemented in connection with FIG. 6.

In the example of FIG. 6, the user is interacting with a trading interface to place or at least analyze a market for a tradeable object (block 600). FIG. 7A illustrates an example trading interface 700A with which the user is interacting to analyze the market. The example trading interface 700A of FIG. 7A includes a value axis 702 having a value column 704 corresponding to the value column 404 of FIGS. 4A-4E and a fee column 706. In the example of FIG. 7A, the default fees that apply to orders at the different price levels are shown in the fee column 706. The example of FIG. 7A illustrates a mode of the fee column 706 in which the fees are displayed without consideration of any reward or penalty. That is, the example of FIG. 7A reflects the fees imposed by the exchange in the absence of any pricing incentives. The example of FIG. 7A may be presented when the user initiates an interaction with the trading interface (for example, by default).

To determine whether the user is entitled to any reward(s), the example of FIG. 6 includes an identification of the user by, for example, obtaining an identifier associated with the user (block 602). Using the identity of the user as a query, for example, the example of FIG. 6 obtains reward(s) to which the user is currently entitled (block 604). In the illustrated example, obtaining the reward(s) involves looking up reward data associated with the identified user in a database including, for example, flags indicative of which pricing incentives have been obtained by the user based on, for example, high quality trading activity. In the illustrated example of FIG. 7, the reward(s) are based on, for example, recent trading activity of the user, as disclosed above in connection with FIG. 5.

In the example of FIG. 6, different percentages of the reward(s) to which the user is qualified are applied to the order based on which price level is selected. Accordingly, in the example of FIG. 6, different transaction adjusted values are calculated for the different price levels (block 606). FIG. 7B includes a trading interface 700B indicative of example price levels that include full reward application, example price levels that include partial reward application, and example price levels that include a penalty. In the example of FIG. 7B, the degree of reward application (or penalty) is based on proximity to the inside market.

At the moment represented in FIG. 7B, the inside market corresponds to a first group of price levels 708. As indicated in the fee column 706, the reward(s) to which the user is entitled are applied in full (for example, as a credit having a cash equivalent) for orders placed at those price levels 708. While the example of FIG. 7B includes a '+Credit' indicator, a numeric and/or graphical representation of the transaction adjusted value calculated at block 606 of FIG. 6 may be incorporated into the appropriate cell of the fee column 706 (block 608). At other price levels, the reward(s) to which the user is entitled are only partially applied or eliminated. In the example of FIG. 7B, orders placed at a second group of price levels 710 receive only a percentage of the reward(s) to which the user has qualified. The example of FIG. 6, at block 606, has calculated the transaction adjusted value for the second group of price levels 710 based on the partial application (for example, seventy-fix percent of the cumulative reward to which the user is qualified). The example of FIG. 7B includes a 'partial credit' indicator and a 'fee' indicator for the second group of price levels 710. However, the calculated transaction adjusted value may be incorporated into the example of FIG. 7B (block 608). At a third group of price levels 712, the reward(s) for the user has qualified is/are eliminated due to a distance away from the inside market (which corresponds to the first group of price levels 708 in FIG. 7B). Thus, in the example of FIG. 7B, orders placed at the third group of price levels 712 do not receive the reward(s). The transaction adjusted value in such instances is the same as the default transaction value and, thus, a representation of the default fees are incorporated into the trading interface 700B in the cells corresponding to the third price levels 712 in the example of FIG. 7B (block 608). At a fourth group of price levels 714, penalties are imposed on the user. In the example of FIG. 7B, a representation of the transaction adjusted value (for example, an increased fee) is incorporated into the trading interface 700B in the cells corresponding to the fourth price levels 714.

Thus, the user is presented with the trading interface 700B having the transaction adjusted value presented in connection with the corresponding price levels. Accordingly, the user is presented with options for purchases the tradeable object, the value of which depends on the price level selected due to the different reward(s) or penalties that will apply to the order. FIG. 7C illustrates an alternative manner of representing the transaction adjusted value of the different possible orders in the fee column 706. In particular, the example trading interface 700C of FIG. 7C includes specific amounts (rather than discount or penalty percentages) that represent the default fee, the reduced fee according to the reward(s), or the increased fee according to the penalties. In the example of FIG. 7CB, the groups of price levels are similar to those of FIG. 7B in terms of the inside market corresponding to the first group 708 and the other price levels extending from the first group 708.

Another manner of representing the transaction adjusted values disclosed herein is illustrated in FIG. 7D. In the example of FIG. 7D, the trading interface 700D does not include the fee column 706. Rather, the incorporation of the transaction adjusted value of block 608 includes summing the price of the value column 704 and the transaction of the fee column 706 to generate a cumulative representation of the transaction adjusted value. As such, the example of FIG. 7D includes a cumulative value column 716 in which an asterisk (or other type of highlighting designation) is incorporated to represent the alteration of the price.

As described above in connection with FIGS. 4A-4E, an order may be placed via the trading interface at a selected price level. In the example of FIG. 6, such a selection is detected (block 610), and the appropriate reward/penalty is applied to the order (block 612). The order is then placed at the exchange (block 614). The example of FIG. 6 then ends (block 616).

Figure 8:
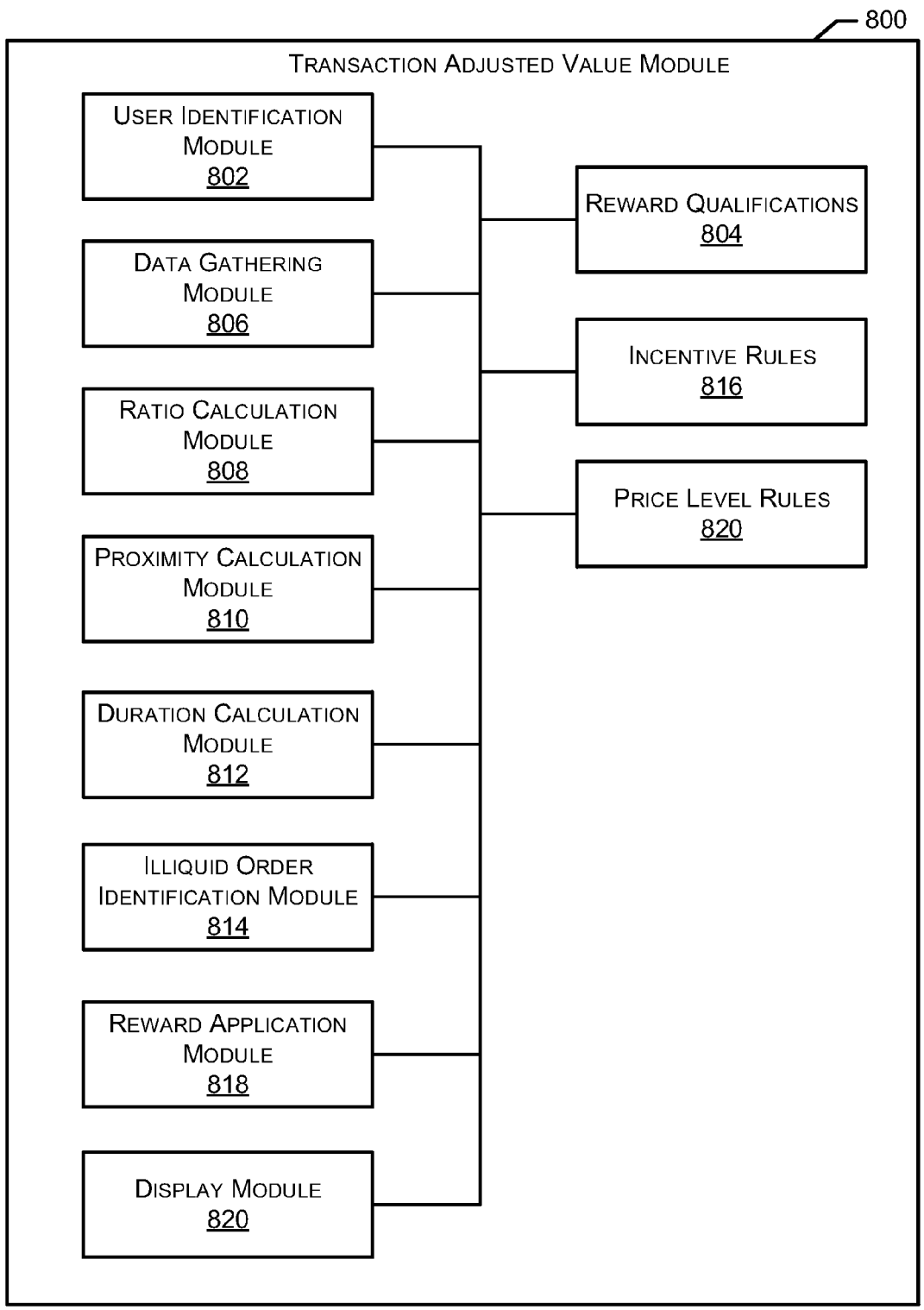
FIG. 8 is a block diagram representative of an example transaction adjusted value module that can implement the example machine readable instructions of FIGS. 5 and/or 6.

FIG. 8 is a block diagram representative of an example transaction adjusted value module 800 that can implement the example machine readable instructions of FIGS. 5 and/or 6 and can implement the example trading interfaces 700A-700D of FIGS. 7A-7D.

The example transaction adjusted value module 800 of FIG. 8 includes a user identification module 802 to determine an identity of a user. The example user identification module 802 assigns and/or obtains an identifier associated with the user and uses the identifier to track reward qualifications 804 of the user. In some examples, the reward qualifications 804 of the user are based on the activity of the individual user. In some examples, the reward qualifications 804 are based on a combination of the individual user and at least one other user associated with the user (for example, a partner or co-worker at a trading firm).

The example transaction adjusted value module 800 of FIG. 8 includes a data gathering module 806 to obtain information indicative of trading activity engaged in by the identifier user. The data gathered by the example data gathering module 806 of FIG. 8 is representative of trading activity, such as details and/or characteristics of orders placed during the most recent month or any other suitable period of time and/or amount of trading activity. To characterize the trading activity of the user based on, for example, the gathered data, the example transaction adjusted value module 800 of FIG. 8 includes a ratio calculation module 808, a proximity calculation module 810, a duration calculation module 812, and an illiquid order identification module 814. Additional or alternative techniques, statistics and/or measurements of trading activity can be used by the example transaction adjusted value module 800 of FIG. 8 to determine whether and/or to what degree the user is engaged in high quality trading activity and/or poor quality trading activity. The example transaction adjusted value module 800 of FIG. 8 includes a plurality of incentive rules 816 including respective thresholds that are compared with which the characterizing data generated by the ratio calculation module 808, the proximity calculation module 810, the duration calculation module 812, and the illiquid order identification module 814. If the data characterizing the user trading activity meets any of the incentive rules 816, the corresponding pricing incentive is tracked in the reward qualifications 804. Further, the example transaction adjusted value module 800 of FIG. 8 includes a plurality of disincentive rules 818 that may be used to discourage low quality trading activity.

The example ratio calculation module 808 of FIG. 8 determines a current transaction-to-fill ratio of the user. In the illustrated example, the transaction-to-fill ratio represents a total number of orders divided by total number of fills obtained by the user. Thus, a transaction-to-fill ratio near a value of one (1.0) indicates that the user is engaged in high quality trading activity, while a value much greater than one indicates that the user is engaged in low quality trading activity. If the transaction-to-file ratio calculated by the example ratio calculation module 808 meets the corresponding threshold of the incentive rules 816, a flag is set in the reward qualifications 804 indicative of the user being qualified for a transaction-to-file ratio pricing incentive.

The example proximity calculation module 810 of FIG. 8 calculates an average proximity to an inside market of orders placed by the user according to, for example, the data gathered by the example data gathering module 806. As orders placed near the inside market have a greater likelihood of being filled, the example transaction adjusted value module 800 of FIG. 8 values users tending to place orders at or near the inside market. If the average proximity to the inside market calculated by the example proximity calculation module 810 meets the corresponding threshold of the incentive rules 816, a flag is set in the reward qualifications 804 indicative of the user being qualified for an inside market proximity pricing incentive.

The example duration calculation module 812 of FIG. 8 calculates an average order duration of orders placed by the user. As orders remaining in the market longer provide more opportunity for opposing users to fill an order, the example transaction adjusted value module 800 of FIG. 8 values users tending to leave orders in the market for greater durations. If the average duration generated by the example duration calculation module 812 meets the corresponding threshold of the incentive rules 816, a flag is set in the reward qualifications 804 indicative of the user being qualified for an order duration pricing incentive.

The example illiquid order identification module 814 of FIG. 8 identifies a number of orders placed in illiquid markets by the user. As such orders typically increase available quantity in markets with low available quantity, the example transaction adjusted value module 800 of FIG. 8 values users placing orders in illiquid markets. If the number of orders placed in illiquid markets by the user meets the corresponding threshold of the incentive rules 816, a flag is set in the reward qualifications 804 indicative of the user being qualified for an illiquid market pricing incentive.

While the example reward qualifications 804 are described above as including a flag for each pricing incentive, additional detail may be included in the example reward qualifications 804. For example, each of the reward qualification 804 may include one or more reward amount (for example, discount percentage) commensurate with pricing incentives provided by the corresponding exchange. Different exchanges likely provide different pricing incentives and, thus, the example reward qualifications 804 track the different amounts for the different exchanges. Further, the example incentive rules 816 of FIG. 8 may vary from exchange to exchange and, thus, different threshold comparisons may be performed for the different exchanges. Accordingly, while the user qualifies for a first pricing incentive with a first exchange, the user may not qualify for a second pricing incentive with a second exchange. The example reward qualifications 804 and the example incentive rules 816 facilitate tracking of the different conclusions of the different threshold comparisons to the trading activity characteristics generated by the example modules 808-814 and/or alternative modules. Further, example reward qualifications 804 of FIG. 8 track a cumulative (for example, a weighted average) of the rewards for which the user qualifies. As the pricing incentives may vary from exchange to exchange, the example reward qualifications 804 of FIG. 8 track different cumulative rewards for different exchanges.

The example transaction adjusted value module 800 of FIG. 8 includes a reward application module 818 to ensure that reward(s) to which the user is entitled are factored into placed orders. For example, when an order is entitled to at least one reward, the example reward application module 818 associates a reward assertion with the order (for example, by appending additional information to one or more message components). In the illustrated example of FIG. 8, the example reward application module references price level rules 820 to determine whether only a partial amount of the reward is to be applied. In some examples, the amount of the qualified reward is reduced for orders placed far away from the inside market. Alternatively, the reward may be applied equally across price levels.

To facilitate application of the pricing incentives to the orders, the example reward application module 818 calculates a transaction adjusted value for potential orders. The transaction adjusted value for a potential order includes a combination of the cost of the tradeable object, as well as the corresponding transaction cost, which may be adjusted by the example pricing incentives tracked in the reward qualifications 804. The example reward application module 818 calculates the transaction adjusted value for the different potential trades and facilitates communication of the same to the user. In the illustrated example, the reward application module 818 provides the calculated transaction adjusted values to a display module 820, which generates, for example, the trading interfaces 700A-700D of FIGS. 7A-7D. Further, the example display module 820 incorporates the transaction adjusted values calculated by the reward application module 818 into the trading interface. In some examples, one or more user preferences and/or settings determine the manner in which the transaction adjusted values are incorporated into the trading interface. Such settings and/or preference are tracked by the example display module 820 of FIG. 8. For example, whether the incorporation shown in FIG. 7B, 7C or 7D is selectable by the user and the example display module 820 of FIG. 8 tracks the selection.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodi-

What is claimed is:

1. A method comprising:
   displaying, via a processor, a plurality of price levels for a tradeable object along a value axis on a trading graphical user interface, wherein the tradeable object is listed on an electronic exchange;
   determining, via a processor, that a user of the trading graphical user interface qualifies for a pricing incentive that rewards trading activity meeting a threshold;
   determining, via the processor, a first plurality of price levels of the plurality of price levels that qualify for the pricing incentive based on the first plurality of price levels being within a threshold number of price levels from a current highest bid price or a lowest ask price;
   determining, via the processor, a second plurality of price levels of the plurality of price levels that do not qualify for the pricing incentive based on the second plurality of price levels not being within the threshold number of price levels from the current highest bid price or the lowest ask price;
   based on the user qualifying for the pricing incentive, calculating, via the processor, a transaction adjusted value for an order for the tradeable object at each of the plurality of price levels displayed on the trading graphical user interface, wherein the pricing incentive is factored into the calculation of the transaction adjusted value for the first plurality of price levels, wherein a transaction value at the first plurality of price levels is reduced based on the pricing incentive, and the pricing incentive is not factored into the calculation of the transaction adjusted value of the second plurality of price levels, wherein a transaction value at the second plurality of price levels is not reduced based on the pricing incentive;
   displaying, via the processor, along the value axis of the graphical user interface each of the calculated transaction adjusted values in relation to the respective price level of the first plurality of price levels and the second plurality of price levels for which each transaction adjusted value was calculated;
   displaying, via the processor, an order entry region on the trading graphical user interface, wherein the order entry region comprises a plurality of locations aligned with the value axis, wherein each location of the plurality of locations corresponds to a respective price level of the displayed plurality of price levels along the value axis;
   receiving a selection via a user input device of a location of the plurality of locations in the order entry region; and
   in response to receiving the selection of the location in the order entry region, initiating submission of an order to buy or sell the tradeable object at the electronic exchange at a price level corresponding to the selected location.

2. The method of claim 1, wherein determining that the user qualifies for the pricing incentive that rewards trading activity meeting the threshold comprises determining that a transaction-to-fill ratio associated with the user meets the threshold.

3. The method of claim 1, wherein determining that the user qualifies for the pricing incentive that rewards trading activity meeting the threshold comprises determining that an order duration associated with the user meets the threshold.

4. The method of claim 1, wherein determining that the user qualifies for the pricing incentive that rewards trading activity meeting the threshold comprises determining that a number of orders placed in illiquid markets meets the threshold.

5. The method of claim 1, further comprising applying the pricing incentive to the order when a selection is made from the plurality of price levels.

6. The method of claim 1, wherein the trading graphical user interface is a ladder display including pricing levels arranged into a column.

7. A tangible non-transitory computer readable medium comprising instructions that, when executed by a processor, cause the processor to at least:
   displaying a plurality of price levels for a tradeable object along a value axis on a trading graphical user interface, wherein the tradeable object is listed on an electronic exchange;
   determine that the user qualifies for a pricing incentive that rewards trading activity meeting a threshold;
   determine a first plurality of price levels of the plurality of price levels that qualify for the price incentive based on the first plurality of price levels being within a threshold number of price levels from a current highest bid price or a lowest ask price;
   determine a second plurality of price levels of the plurality of price levels that do not qualify for the price incentive based on the second plurality of price levels not being within the threshold number of price levels from the current highest bid price or the lowest ask price;
   based on the user qualifying for the pricing incentive, calculate a transaction adjusted value for an order for the tradeable object at each of the plurality of price levels displayed on the trading graphical user interface, wherein the pricing incentive is factored into the calculation of the transaction adjusted value for the first plurality of price levels, wherein a transaction value at the first plurality of price levels is reduced based on the pricing incentive, and the pricing incentive is not factored into the calculation of the transaction adjusted value of the second plurality of price levels, wherein a transaction value at the second plurality of price levels is not reduced based on the pricing incentive;
   display, along the value axis of the graphical user interface, each of the calculated transaction adjusted values in relation to the respective price level of the first plurality of price levels and the second plurality of price levels for which each transaction adjusted value was calculated;
   display an order entry region on the trading graphical user interface, wherein the order entry region comprises a plurality of locations aligned with the value axis, wherein each location of the plurality of locations corresponds to a respective price level of the displayed plurality of price levels along the value axis;
   receive a selection via a user input device of a location of the plurality of locations in the order entry region; and
   in response to receiving the selection of the location in the order entry region, initiate submission of an order to buy or sell the tradeable object at the electronic exchange at a price level corresponding to the selected location.

8. The computer readable medium of claim 7, wherein determining that the user qualifies for the pricing incentive that rewards trading activity meeting the threshold comprises determining that a transaction-to-fill ratio associated with the user meets the threshold.

9. The computer readable medium of claim 7, wherein determining that the user qualifies for the pricing incentive that rewards trading activity meeting the threshold comprises determining that an order duration associated with the user meets the threshold.

10. The computer readable medium of claim 7, wherein determining that the user qualifies for the pricing incentive that rewards trading activity meeting the threshold comprises determining that a number of orders placed in illiquid markets meets the threshold.

11. The computer readable medium of claim 7, wherein the instructions, when executed, cause the processor to apply the pricing incentive to the order when a selection is made from the plurality of price levels.

12. The computer readable medium of claim 7, wherein the trading graphical user interface is a ladder display including pricing levels arranged into a column.

\* \* \* \* \*